L. FELIZAT.
PROCESS OF EXTRACTING OILS FROM FULLERS' EARTH AND LIKE MATERIALS.
APPLICATION FILED FEB. 25, 1910.
1,070,435.
Patented Aug. 19, 1913.
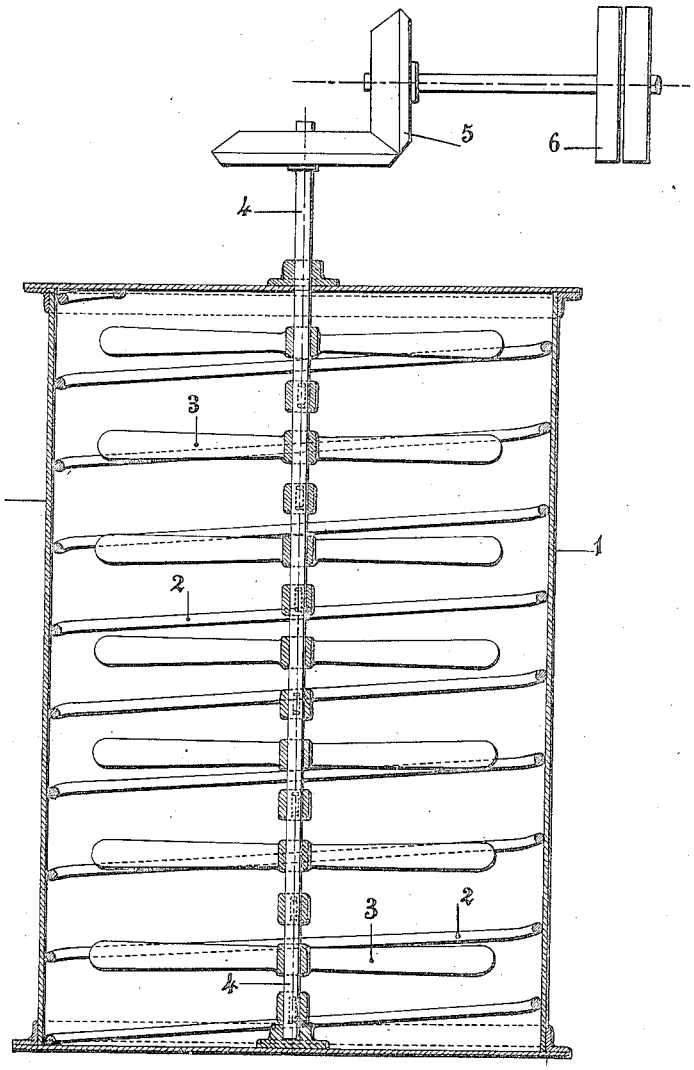

UNITED STATES PATENT OFFICE.

LOUIS FÉLIZAT, OF SALON, BOUCHES-DU-RHÔNE, FRANCE, ASSIGNOR TO LA SOCIÉTÉ HUILERIE, ET SAVONNERIE DE LURIAN, OF SALON, BOUCHES-DU-RHÔNE, FRANCE.

PROCESS OF EXTRACTING OILS FROM FULLERS' EARTH AND LIKE MATERIALS.

1,070,435. Specification of Letters Patent. Patented Aug. 19, 1913.

Application filed February 25, 1910. Serial No. 545,896.

*To all whom it may concern:*

Be it known that I, LOUIS FÉLIZAT, a citizen of the Republic of France, residing at Salon, Bouches-du-Rhône, France, have invented a Process of Extracting Oils from Fullers' Earth and Like Materials, of which the following is a specification.

This invention has for its object to effect practically the complete extraction of the oil contained in hydrosilicates, fullers' earth, animal charcoal or mineral black that has been used for decoloring oils.

The process by means of which this result is obtained consists in adding salt water to the earths or products in question, heating to a temperature of about 85 degrees and then treating with sulfuric acid and carbonate of soda thrown gradually and carefully into the mass while the same is being constantly agitated by means of a suitable apparatus. This results in a vigorous evolution of carbonic acid which separates the oil from the residues. The presence of the salt in the water renders the separated oil clear. While the salt, however, may be omitted without seriously affecting the extraction of the oil, the oil separated is not as clear and the full advantages of the invention are not secured.

The accompanying drawing represents diagrammatically in vertical section suitable apparatus for carrying out this process.

This apparatus comprises a cylindrical vat 1 within which and in contact with the walls thereof is arranged a steam heating coil 2. For agitating the material placed in the vat for treatment there is arranged in the vat a beater 3 provided with blades and having a vertical shaft driven from the exterior of the vat through any suitable transmission gear 5 and 6.

The operation with the apparatus described is conducted in the following manner:—A quantity of about 2000 kilos of the earths or products in question and from 700 to 800 kilos of salt water of from 7 to 8 degrees Baumé is placed in the vat and steam admitted to the coil 2 until the temperature of the mass is about 85 degrees centigrade. A liter of sulfuric acid 66° Baumé is then added, the beater 3 is set in motion and carbonate of soda carefully thrown into the mass. When the evolution of carbonic acid has taken place and after about a quarter of an hour, the beaters 3 are stopped and the oil will be found at the surface of the mixture and it only remains to collect the same.

For 2000 kilos of fullers' earth, which has been used for the purpose mentioned above and which is usually more or less acid, from 100 to 110 kilos of carbonate of soda $Na_2CO_3 10H_2O$ are required.

By the application of the process hereinbefore described fullers' earth after having been used for decoloration and containing 80% of oil, and which after passing through the press still contains, notwithstanding its having undergone heavy pressure, 20% of oil may, by the processes hereinbefore set forth, have the percentage of residual oil reduced to as low as 2%.

What I claim is:—

1. The process of recovering oil from fullers' earth and like materials used in refining oils, consisting in incorporating with said refining material salt water and an alkaline carbonate and then introducing into the mixture an acid to liberate carbonic acid for the purpose described.

2. The process of recovering oil from fullers' earth and like materials used for refining oils, consisting in incorporating with said material salt water heating the mixture and incorporating sodium carbonate and sulfuric acid for the purpose described.

3. The process of recovering oil from fullers' earth and like materials used in refining oils, consisting in incorporating with said material salt water sufficient to effect fluidity of the mass and adding an alkaline carbonate and an acid while subjecting the mass to heat and agitation for the purpose described.

4. The process of recovering oil from fullers' earth and like materials used in refining oils consisting in incorporating with 2000 parts by weight of said material, 700 to 800 parts of salt water of about 7° to 8° Baumé, heating the mass to about 85° C., and incorporating 100 to 110 parts crystallized soda and one part of sulfuric acid for the purpose described.

5. The process of recovering oil from fullers' earth and like materials used in refining oils, consisting in incorporating water and a soluble alkaline carbonate with said material to form a fluid mass, heating the mixture and then liberating throughout the mass carbonic acid gas from said carbonate for the purpose of freeing the oil from the particles of earthy material and permit the same to rise to the top of the mass.

6. Extracting the oil contained in hydrosilicates, fullers' earth, animal charcoal or mineral black that has been used for decoloring oil, by adding salt water to the earth or products in question, heating the mixture to a temperature of about 85 degrees, then treating the heated mixture with sulfuric acid and sodium carbonate which is carefully thrown into the mass while it is being agitated.

Signed at Paris, France, this fifteenth day of February 1910.

LOUIS FÉLIZAT.

Witnesses:
  DOMINIQUE CASALONGA,
  LUCIEN SANTINI.